E. H. GOLD.
HOSE COUPLING GASKET.
APPLICATION FILED MAR. 19, 1919.
1,409,373.
Patented Mar. 14, 1922.
2 SHEETS—SHEET 1.
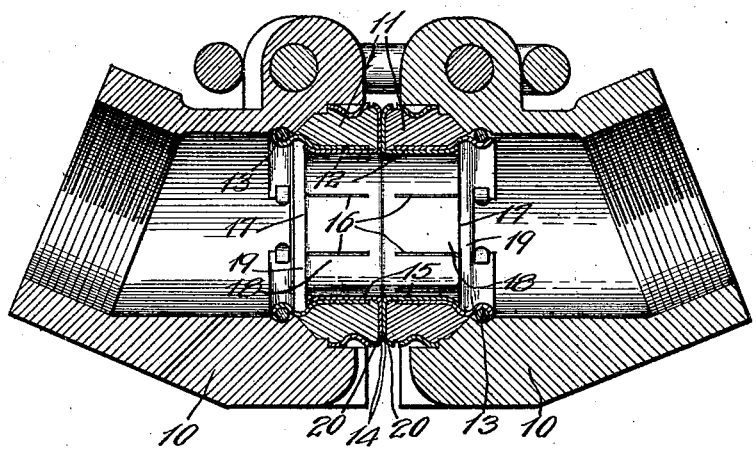
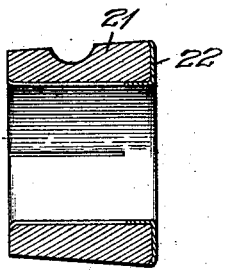
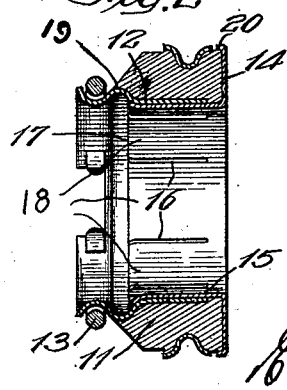

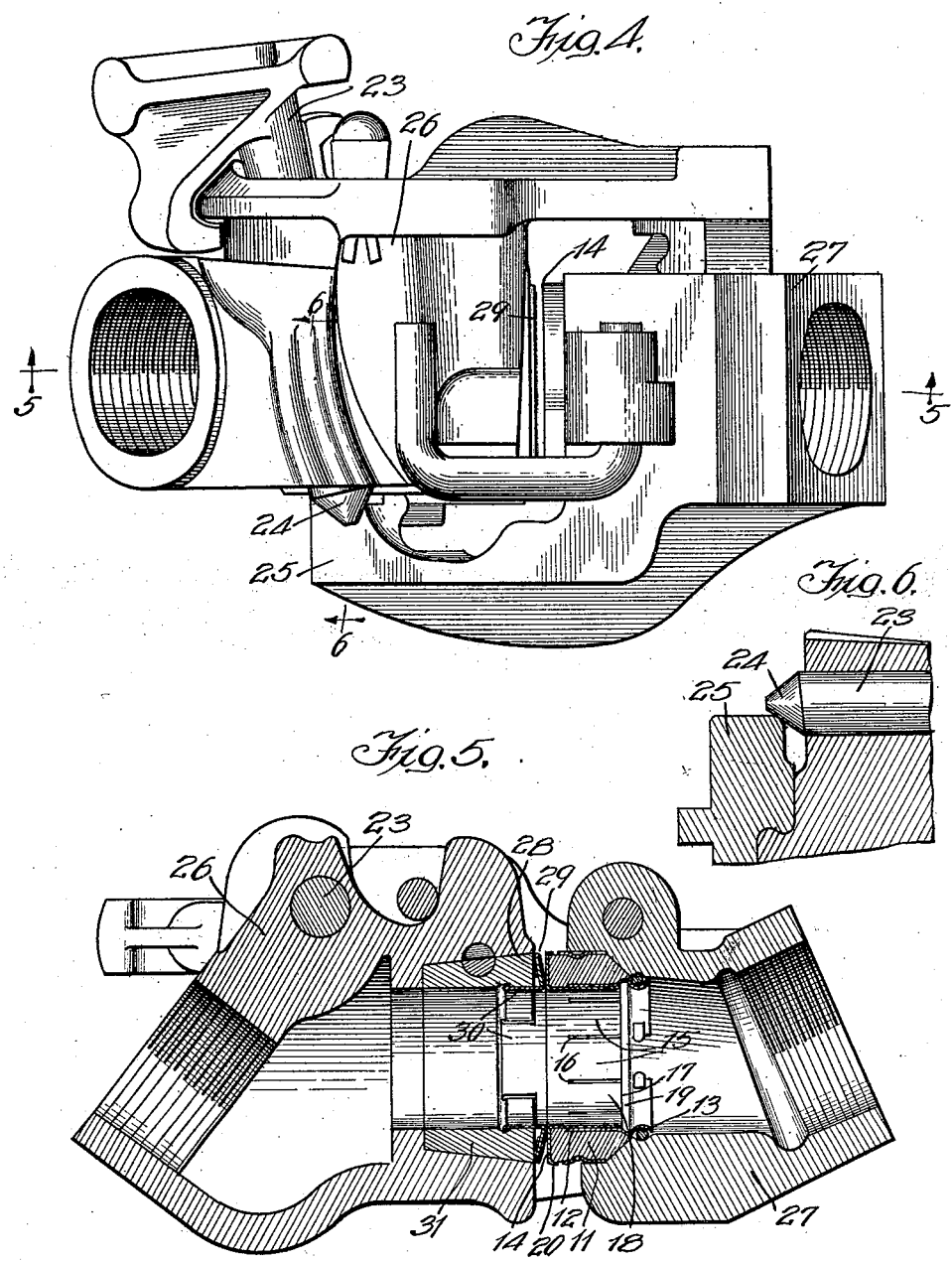

UNITED STATES PATENT OFFICE.

EGBERT H. GOLD, OF CHICAGO, ILLINOIS.

HOSE-COUPLING GASKET.

1,409,373. Specification of Letters Patent. Patented Mar. 14, 1922.

Application filed March 19, 1919. Serial No. 283,520.

*To all whom it may concern:*

Be it known that I, EGBERT H. GOLD, a citizen of the United States, residing at Chicago, in the county of Cook, State of Illinois, have invented certain new and useful Improvements in Hose-Coupling Gaskets, of which the following is a specification.

My invention relates to hose couplings, and particularly to straight port couplings of the type used for connecting the steam train pipes on railway cars; and the object of the invention is to provide an improvement in the gaskets used in couplings of this sort. These gaskets have ordinarily been made of a rubber-like composition such as a mixture of rubber and plumbago or of other similar plastic material which is relatively hard but slightly compressible and capable of expanding under the temperature of steam. Gaskets of this sort are quite expensive and experience has shown that they are easily mutilated, particularly at the face of the gasket by the rocking of one coupler on the other, in a Sewall or gravity type of coupler, and by the pressure exerted between the gaskets when the couplers are locked together by some wedging device as is the case with couplers of certain well known types. My invention provides a thin metal armoring or facing to cover the face of the gasket which will protect a composition gasket body of the character above referred to, against these destructive pressures while permitting the expansion of the gasket where such expansion is necessary, in order to give a steam tight joint. Preferably the armoring is made so that it can be readily attached to and detached from the gasket body, as this may be desirable in some cases.

The invention is illustrated, in certain preferred embodiments, in the accompanying drawings, wherein—

Fig. 1 is a cross sectional view of a pair of mating couplers of the "safety" type provided with the usual composition gaskets armored in accordance with my invention.

Fig. 2 is a cross sectional view of the gasket.

Fig. 3 is a similar view of the armoring applied to a gasket of the form commonly used with the "Chicago" type of coupler.

Fig. 4 is a plan view illustrating a "safety" coupler and a "Chicago" coupler in interlocked relation (standard couplers being interchangeable), one of the couplers being provided with a metal gasket member and the other with a gasket armored in accordance with my invention.

Fig. 5 is a sectional view on line 5—5 of Fig. 4, and

Fig. 6 is a fragmentary sectional view on line 6—6 of Fig. 4.

Like characters of reference designate like parts in the several figures of the drawings.

Referring first to Figs. 1 and 2, 10 indicates a coupler of the "safety" type which is of well known construction and will not require detailed description, and 11 the usual plastic composition gasket having an interior metal sleeve 12 and an expansion ring 13 for engaging the gasket with the coupler head. In accordance with my invention the face of this gasket is covered with a thin metal facing 14 preferably made of copper or brass. This facing member is formed with an integral flange 15 slitted at 16 to make it slightly collapsible. This flange lies against the inner surface of the annular gasket body and its inner edge is bent to form outturned lips 17 on the spring fingers 18 provided by slits 16, which lips engage the groove 19 formed in the metal attaching member 12 of the gasket. The facing member is preferably formed at its outer edge with a short circumferential lip 20 overlapping the outer surface of the composition body. The armoring effectually protects the face of the gasket against being frayed or otherwise mutilated when the couplers are rocked to engage or disengage them, the "safety" couplers being of the common Sewall or gravity type. The armoring permits the gasket to expand under the relatively high temperature of the steam passing through the coupling, this expansion being necessary in a coupling of this sort in order to insure a steam-tight joint.

Fig. 3 illustrates an application of the armoring to a gasket of the sort used in a "Chicago" type coupler, the composition body being indicated at 21 and the metal facing member at 22.

The "Chicago" type of coupler, this type being also well known, has a revoluble locking member 23 with an eccentric conical end 24 adapted to bear against the arm 25 of the mating coupler (Figs. 4, 5 and 6), the locking member being located in a bore formed in the coupler head 26. In these figures the mating coupler is shown as a "safety" type coupler and designated 27, arm 25 just referred to being a part of this coupler. The locking member 23 may be driven home so hard as to produce considerable pressure between the gaskets. The danger that this pressure will mutilate a plastic composition gasket is enhanced if one of the couplers is provided with a metal gasket member such as is shown in Figs. 4 and 5, in connection with the "Chicago" coupler. This metal gasket member, which is not claimed herein, being the invention of Edward N. Roth and described and claimed in application for United States patent filed March 18, 1919, Serial No. 283,291, consists of a steel ring 28, to a certain extent resilient but quite stiff, with a soft metal covering 29 provided with fingers 30 for engaging the ring either to the coupler or to the ordinary coupler gasket 31, the latter arrangement being shown in the drawings. Obviously a gasket member of this type, if thrust with force against the ordinary plastic composition gasket, would be likely to injure the face of the latter. By armoring the other gasket in the manner previously described this danger is eliminated.

I claim:

1. In combination with a hose coupler gasket body made of a hard rubber-like composition expansible longitudinally at the temperature of steam, a thin metal armoring attached to said body so as to permit the longitudinal expansion thereof and covering the face thereof.

2. In combination with a hose coupler gasket body made of a hard rubber-like composition, a thin metal armoring detachably engaged with said body and covering the face thereof.

3. In combination with a hose coupler gasket body made of a hard rubber-like composition, a thin metal armoring detachably engaged with said body so as to permit longitudinal expansion of the body under rise of temperature and which covers the face of said body.

4. In combination with a hose coupler gasket body of annular form and made of plastic material, a thin metal facing provided with a spring member unitary therewith for projecting into and engaging the interior surface of the gasket body to hold the facing member on the gasket body.

5. In combination with a hose coupler gasket body of annular form and made of plastic material, a thin metal facing provided with a spring member unitary therewith for projecting into and engaging the interior surface of the gasket body to hold the facing member on the gasket body, and with a flange at its outer edge which overlaps the outer surface of said body.

6. In combination with a hose coupler gasket body annular in form, made of plastic material and formed with an internal groove, a thin, soft metal facing member covering the face of the gasket and provided with a flange, split to form spring fingers, adapted to extend into the gasket body and engage said groove.

7. In combination with a hose coupler gasket body annular in form, made of plastic material and formed with an internal groove, a thin, soft metal facing member covering the face of the gasket and provided with a flange, split to form spring fingers, adapted to extend into the gasket body and engage said groove, and a circumferential flange on its outer edge to overlap the outer surface of the gasket body.

8. In a hose coupler gasket, the combination of a substantially cylindrical body of plastic composition expansible longitudinally at the temperature of steam, formed at its inner end with an internal shoulder, and a thin metal armoring covering the outer face of said body and provided with a spring member projecting into the interior of said body and engaging said shoulder.

EGBERT H. GOLD.